(12) United States Patent
Takayama et al.

(10) Patent No.: US 6,371,996 B1
(45) Date of Patent: Apr. 16, 2002

(54) MANUFACTURING METHOD OF BATTERIES

(75) Inventors: Gen Takayama, Takasaki; Toshiya Terui, Abiko; Nobuo Kawamura, Kawasaki, all of (JP)

(73) Assignee: Toshiba Battery Co., Ltd., Tokyo (JP)

( * ) Notice: Subject to any disclaimer, the term of this patent is extended or adjusted under 35 U.S.C. 154(b) by 0 days.

(21) Appl. No.: 09/557,774

(22) Filed: Apr. 25, 2000

(30) Foreign Application Priority Data

Apr. 26, 1999 (JP) .......................................... 11-118300

(51) Int. Cl.$^7$ ................................................ H01M 2/36
(52) U.S. Cl. ...................... 29/623.2; 429/127; 429/162
(58) Field of Search ........................ 29/623.2; 429/127, 429/162

(56) References Cited

U.S. PATENT DOCUMENTS 5,916,704 A * 6/1999 Lewin et al. ............ 429/127 X
6,048,638 A * 4/2000 Pendalwar .................. 429/127
6,207,318 B1 * 3/2001 Wessel et al. ................ 429/127

FOREIGN PATENT DOCUMENTS

JP     3-225765     10/1991
JP     3-230474     10/1991

* cited by examiner

Primary Examiner—John S. Maples
(74) Attorney, Agent, or Firm—Finnegan, Henderson, Farabow, Garrett, & Dunner, L.L.P.

(57) ABSTRACT

This manufacturing method of batteries that comprises the steps of accommodating a battery element 4 in an envelope film body 3 of which one end side is opened to form an opening 3a for injecting an electrolytic solution; and sealing the opening 3a after the electrolytic solution 12 is injected from the opening 3a of the envelope film body 3; wherein an opening 3a side of the envelope film body 3 is made larger than a prescribed shape and dimension to use as a temporary reservoir region 3c of an injected electrolytic solution 12, after injection of a prescribed amount of the electrolytic solution 12 the region 3d of the prescribed shape and dimension being sealed and cut to form a battery. According to the method, a manufacturing method of batteries that can not only make smaller and lighter the batteries but also mass-produce batteries of high quality can be provided.

11 Claims, 3 Drawing Sheets

MANUFACTURING METHOD OF BATTERIES

FIELD OF THE INVENTION

The present inventions relates to a manufacturing method of batteries.

DESCRIPTION OF THE RELATED ART

So far, secondary batteries for instance such as non-aqueous solvent type batteries are in broad use as a power source for portable telephones, video cameras or the like. In batteries for power source, as the aforementioned instruments become smaller in size and higher in performance, demands on smaller size, lighter weight, higher voltage, larger capacity and so on are increasingly stronger. Corresponding to these demands, in for instance Japanese Patent Laid-open Application Nos. HEI 3-230474, HEI 3-225765 and so on, polymer batteries of approximately 1 mm thickness are disclosed.

That is, in these batteries, a battery element, after aligning to accommodate in an envelope film body (exterior envelope body/bag body) having one open-end, is wrapped therewith. Then, from the opening thereof a prescribed electrolytic solution is injected. Thereafter, the opening is hot-melted to constitute a hermetic-sealed battery. In manufacturing the above battery, there is another method where after sandwiching the battery element by the envelope film and folding together the film with the battery element inside thereof, opposite peripheries of both sides of the film are mutually hot-melted to seal, resulting in formation of an enveloped body. Further, the battery element can be formed planar by pressing a cylindrically wound body.

FIG. 3 is a cross section showing a substantial constitution of a battery. Here, the battery element 1 comprises a positive sheet electrode 1a and a negative sheet electrode 1b, a sheet electrolyte 1c, a current collector sheet not shown in the figure, and a positive electrode terminal 1a' and a negative electrode terminal 1b'. The positive and negative sheet electrodes 1a and 1b are facing to each other. The sheet electrolyte 1c is hermetically interposed between the both electrodes 1a and 1b. The current collector sheets connect electrically to the electrodes 1a and 1b respectively. The positive electrode terminal 1a' and the negative electrode terminal 1b' are separated from the current collectors of the positive and negative electrodes 1a and 1b. Here, the positive and negative electrode terminals 1a' and 1b' are extended outside of an envelope film body 2.

The positive sheet electrode 1a is composed with lithium ion storing and ejecting lithium containing metal oxides (for instance, lithium manganese compound oxide, lithium containing cobalt oxide) or manganese dioxide as main constituents. The negative sheet electrode 1b is composed of lithium metal or lithium storing and ejecting carbonaceous material, and lithium alloy. The polymer electrolyte 1c is constituted by impregnating or charging ethylene carbonate solution of lithium salt that is non-aqueous electrolytic solution, in separator base material consisting of nonwoven fabric of polypropylene or the like.

SUMMARY OF THE INVENTION

These kinds of planar secondary batteries, compared with lead storage batteries and nickel-cadmium secondary batteries, can be made larger in capacity and lighter in weight. By contrast, there are the following inconveniences. That is, in the steps of manufacturing the batteries, after aligning and accommodating the battery element 1 in the envelope film body 2, a prescribed electrolytic solution is injected.

The reason for the inconveniences is as follows. As a battery is made larger in capacity, the battery element 1 is made finer to result in a decrease of a space for impregnating the electrolytic solution. That is, in order to improve a volume efficiency of a battery, a gap space inside of the envelope film body 2 is made as small as possible. However, reducing the gap space in the envelope film body 2 as small as possible invites a difficulty when the prescribed electrolytic solution is injected. As a result, there is a possibility that the prescribed amount of the electrolytic solution is not injected and is not held inside thereof, resulting in liability to invite fluctuation of battery performance and quality.

To avoid occurrence of such problems, a method has been adopted in which injection and impregnation of the electrolytic solution into the envelope film body 2 therein the battery element 1 is accommodated are repeated a plurality of times. However, a plurality of times of repetition of injection of the electrolytic solution results in an increase of the time needed to inject the electrolytic solution. As a result, due to evaporation of the component of the injected electrolytic solution or to accumulated error of the amount of injection caused by separated injection of the electrolytic solution, accuracy of, the amount of injection of the electrolytic solution is lowered.

The present invention is performed taking into account the above circumstances. The object of the present invention is to provide a manufacturing method of batteries that can not only make the batteries smaller and lighter but also can mass-produce the batteries of high reliability.

A present manufacturing method of batteries comprises the steps of:

accommodating a battery element in an envelope film body of which one end side is opened to form an opening for injecting electrolytic solution; and sealing the opening after the electrolytic solution is injected through the opening of the envelope film body;

wherein the opening side of the envelope film body is made larger in shape and dimension than prescribed ones to form a temporary reservoir of an injected electrolytic solution and after a prescribed amount of the electrolytic solution is injected, a region of the prescribed shape and dimension is sealed and cut to form a battery.

In the above manufacturing method of batteries, in accommodating the battery element, a laminate film formed by disposing resin layers on both surfaces of a metallic layer can be used as an envelope film body.

In the above manufacturing method of batteries, the envelope film body can be sealed by hot-melting the hot-melt film disposed on a sealing region outside of at least the region of prescribed shape and dimension.

In the present invention, relative to the battery element, the opening side of the envelope film body of which one end is opened is made longer. The longer opening side, after utilizing as a temporary reservoir of the electrolytic solution during injection of the solution, is sealed and cut at a region of the prescribed shape and dimension. That is, in the manufacturing steps of the batteries, the opening side that is an opening through which the electrolytic solution is injected in the envelope film body is extended longer than a region to seal and cut at the final stage of production. The extended region of the envelope film body is utilized as an electrolytic solution reservoir (funnel). Thereby, without invoking to inconvenient operations and equipment, with high precision, a definite amount of electrolytic solution can be injected.

In the present invention, for the battery element, a laminate or a planar body can be cited. The laminate is formed by interposing an electrolyte sheet, which concurrently works as a separator of a battery, between the positive and negative sheet electrodes. The planar body is obtained by rolling a winding body in which the electrolyte sheet that concurrently works as a separator of a battery is interposed between the positive and negative sheet electrodes. That is, the battery element comprises a positive sheet electrode, a negative sheet electrode and a polymer-electrolyte system. The positive sheet electrode is formed by laminating a positive electrode containing an active material such as metal oxide, non-aqueous electrolyte and electrolyte holding polymer onto a current collector. The negative sheet electrode is formed by laminating a negative electrode containing an active material storing and ejecting lithium ions, non-aqueous electrolyte and electrolyte holding polymer onto a current collector. The polymer-electrolyte system (for instance, a system of polymer such as hexafluoro propylene-vinylidene fluoride copolymer, and an ethylene carbonate solution of lithium salt, which is a non-aqueous electrolytic solution) functions as a separator and holds the electrolyte.

Here, as the active materials for the positive sheet electrode, for instance lithium manganese compound oxide, manganese dioxide, lithium containing cobalt oxide, lithium containing nickel cobalt oxide and, lithium containing amorphous vanadium pentoxide, chalcogenide compounds or the like can be cited. For the active materials for the negative electrode, for instance, bisphenol resin, polyacrylonitrile, baked cellulose or the like, baked cokes and pitch can be cited. These can include natural or man-made graphite, carbon black, acetylene black, Ketjen black, nickel powder or the like.

For the polymer-electrolyte system, ones in which in polymer electrolytes such as hexafluoropropylene-vinyliden fluoride copolymer, polyacrylonitrile derivatives, polyethylene oxide derivatives or the like, one that is obtained by dissolving approximately 0.2 to 2 mol/l of lithium perchlorate, lithium hexafluorophosphate, lithium tetrafluoroborate, lithium hexafluoroarsenate, lithium trifluoromethane sulfonate or the like in non-aqueous solvent for instance such as ethylene carbonate, propylene carbonate, butylene carbonate, dimethyl carbonate, diethyl carbonate, methyl-ethyl carbonate or the like is occluded can be cited.

For the current collector of the positive sheet electrode, for instance aluminum foil, aluminum mesh, aluminum expanded metal, aluminum punched metal or the like can be cited. For the current collector of the negative sheet electrode, for example copper foil, copper mesh, copper expanded metal, copper punched metal or the like can be cited.

In the present invention, the envelope film body for accommodating the battery element is opened at one end and formed in a bag of which at least sealing and melting portion are formed of hot-melt resin. That is, the envelope film comprises an opening at the one end thereof of which width and length are large enough to be capable of sealing/drawing out and accommodating each electrode terminal of the sheet battery element. The length thereof in a direction toward the opening is made longer than that of the ordinary one. The envelope film body may be previously formed in a bag. Instead, the envelop film can be folded together and the battery element is interposed therebetween while drawing out the electrode terminal, the opposing faces of the both sides of the envelope film being hot-melted to form into a bag in the process of assemblage.

For the films forming the envelope film body, for instance polyimide resin film, polypropylene resin film, a laminate formed by disposing layers of resin on both surfaces of a metallic layer for humidity resistance purpose can be cited. In forming these film materials into an envelope film body, or in hot-melting/sealing the envelope film body after injection of the electrolytic solution, a layer of hot-melt adhesive can be interposed between both sealing surfaces that are facing or at least both opposing sealing surfaces of the film can be preferably made in advance of layers of hot-melt resin.

According to the present invention, in the steps of manufacturing polymer batteries, a prescribed amount of electrolytic solution can be injected with ease and accuracy. Accordingly, batteries of high quality can be manufactured with high yield. That is, by utilizing part of the envelope film body as a reservoir of the injected electrolytic solution, after supplying the prescribed amount of electrolytic solution, even in the continuous manufacturing process, interruption and switching of operations are made unnecessary. Further, even if the region for injecting the electrolytic solution of such as the battery element is dense to invite a difficulty in impregnating the electrolytic solution, the impregnation at a reduced pressure can be implemented as it is. Accordingly, good productivity can be maintained and since the definite amount of injection of the electrolytic solution is possible, batteries of high quality can be provided.

DESCRIPTION OF PREFERRED EMBODIMENTS

In the following, an embodiment will be explained with reference to FIG. 1 and FIGS. 2A to 2C.

Figure 1:
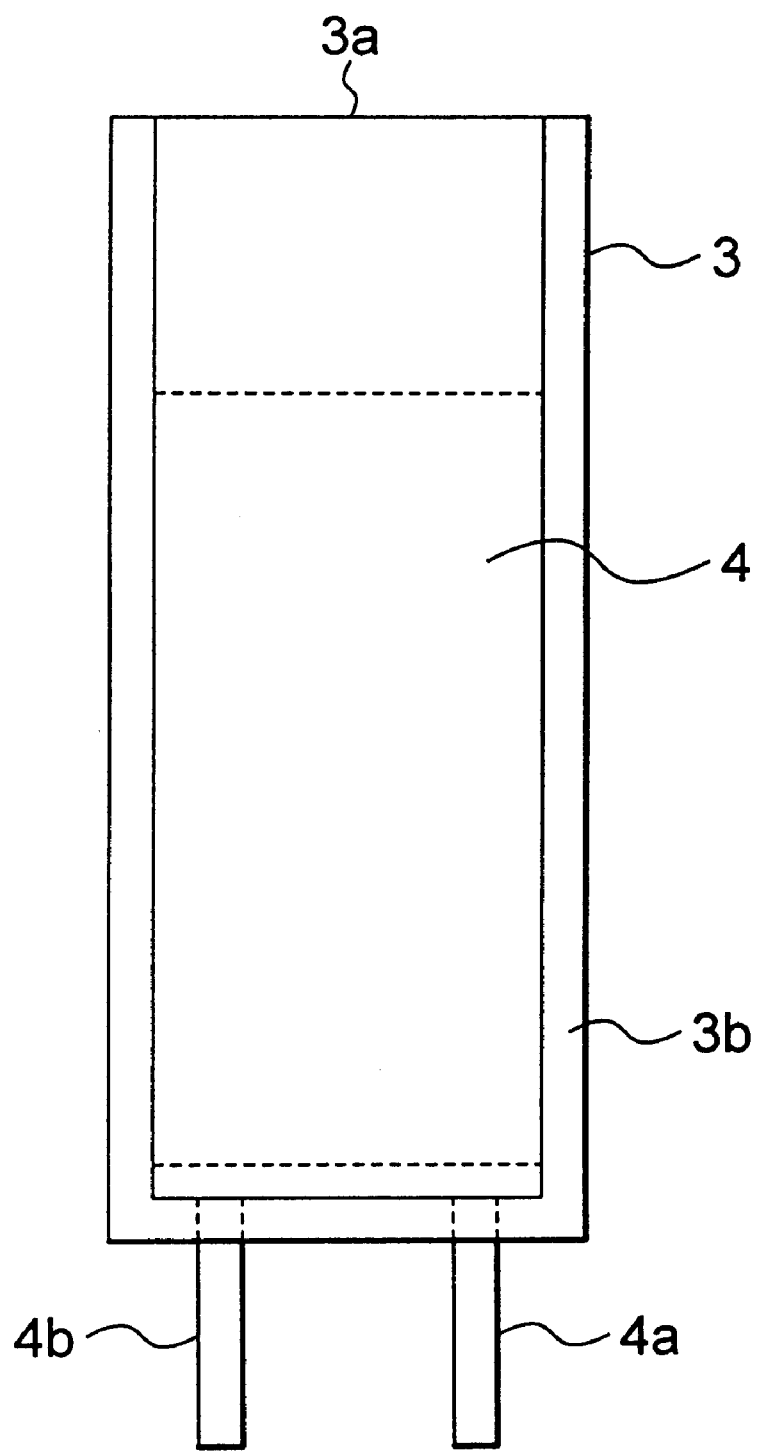
FIG. 1 is a front view showing, in an embodiment, a state where a battery element 4 is aligned and accommodated in an envelope film body.

FIG. 1 is a front view showing a substantial constitution of a battery before injection of an electrolytic solution. That is, the figure shows a state where a battery element 4 is accommodated in an envelope film body 3 provided with an opening 3a, which becomes an opening for injecting electrolytic solution, at one end side. Here, the envelope film body 3 is formed in a longer dimension than that of the accommodated battery element 4.

Here, the envelope film body 3 is made of a laminate film in which on both main surfaces of for instance an aluminum foil layers of polyethylene terephthalate resin are disposed, further on one surface thereof a layer of hot-melt resin (layer of for instance polypropylene resin) being disposed. The envelope film body 3 thus formed, with the layer of the hot-melt resin faced to each other, is laminated so as to interpose the battery element 4. One end thereof is opened to be an opening 3a that becomes an opening for injecting the electrolytic solution, the other periphery 3b being sealed by hot-melting.

The battery element 4 accommodated in the envelope film body 3 comprises positive and negative sheet electrodes that face to each other, a sheet electrolyte, sheet current collectors, and electrode terminals 4a and 4b. The sheet electrolyte is interposed hermetically between these electrodes. The sheet current collectors are electrically connected to the both sheet electrodes respectively. The electrode terminals 4a and 4b are separated from the current collectors of the positive and negative sheet electrodes and corresponding thereto, sealed hermetically and extracted from the envelope film body 3.

Figure 2A:
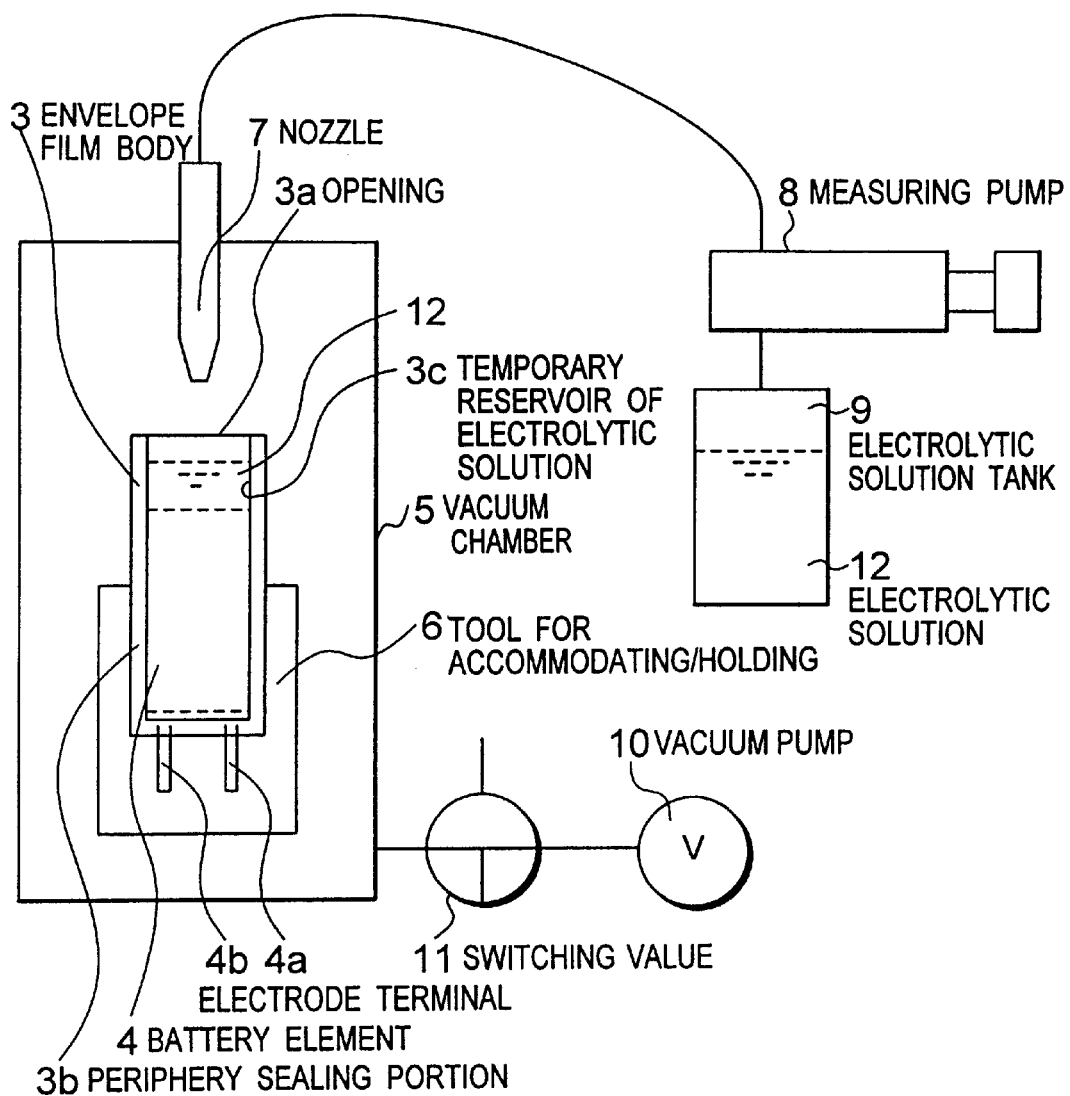
FIG. 2A is a schematic diagram showing states in the order of the steps in an embodiment.

Next, a step of injecting the electrolytic solution into the envelope film body 3 therein the battery element 4 is aligned and accommodated will be explained. FIG. 2A shows schematically an example of a mode of implementation of steps of injecting electrolytic solution. In FIG. 2A, reference numerals 5, 6, 7, 8, 9, 10 and 11 denote a vacuum chamber, a tool for accommodating/holding the envelope film body 3 therein a polymer battery element 4 is aligned and accommodated, a nozzle for injecting the electrolytic solution, a measuring pump for supplying a definite amount of the electrolytic solution, an electrolytic solution tank, a vacuum pump for decompressing the vacuum chamber 5, and a valve for switching between decompression and atmospheric pressure, respectively.

After the envelope film body 3 therein the battery element 4 is aligned and accommodated is set onto the tool 6 in the aforementioned vacuum chamber 5, the vacuum pump 10 is operated to decompress the inside of the vacuum chamber 5. After the degree of decompression in the vacuum chamber 5 reaches a prescribed value, the electrolytic solution 12 from the electrolytic solution tank 9 after measurement at the measuring pump 8 is injected from the nozzle 7 into the opening 3a of the envelope film body 3. Here, the switching valve 11 is operated to return the inside of the vacuum chamber 5 to an atmospheric pressure. The electrolytic solution 12 injected through the opening 3a of the envelope film body 3, with an upper space above the battery element 4 as a temporary reservoir 3c of the electrolytic solution, is successively injected and impregnated into the battery element 4 side.

After the injection of the definite amount of the electrolytic solution is over, the envelope film body 3 therein the battery element 4 is aligned and accommodated is taken out of the vacuum chamber 5. The envelope film body 3 therein the battery element 4 is aligned and accommodated may be taken out of the vacuum chamber 5 when the electrolytic solution is injected into the temporary reservoir 3c of the envelope film body 3. Thereafter, the envelope film body 3 is left for the electrolytic solution to drop due to gravitation for a certain period of time, thereby forwarding impregnation.

Figure 2B:
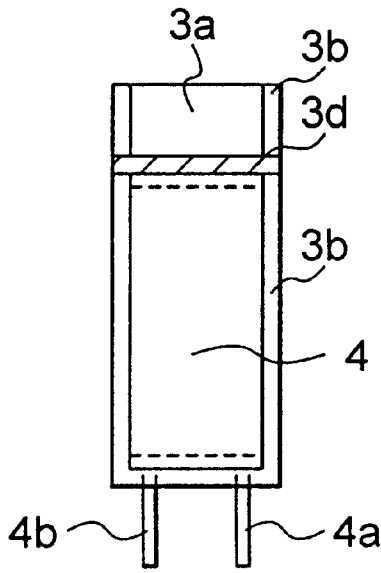
FIG. 2B is a schematic diagram showing states in the order of the steps in an embodiment.
Figure 2C:
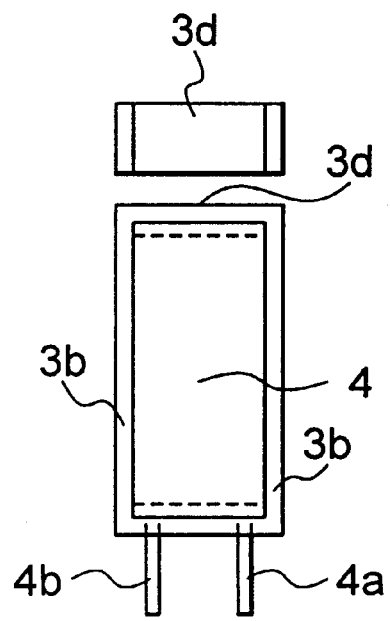
FIG. 2C is a schematic diagram showing states in the order of the steps in an embodiment.
Figure 3:
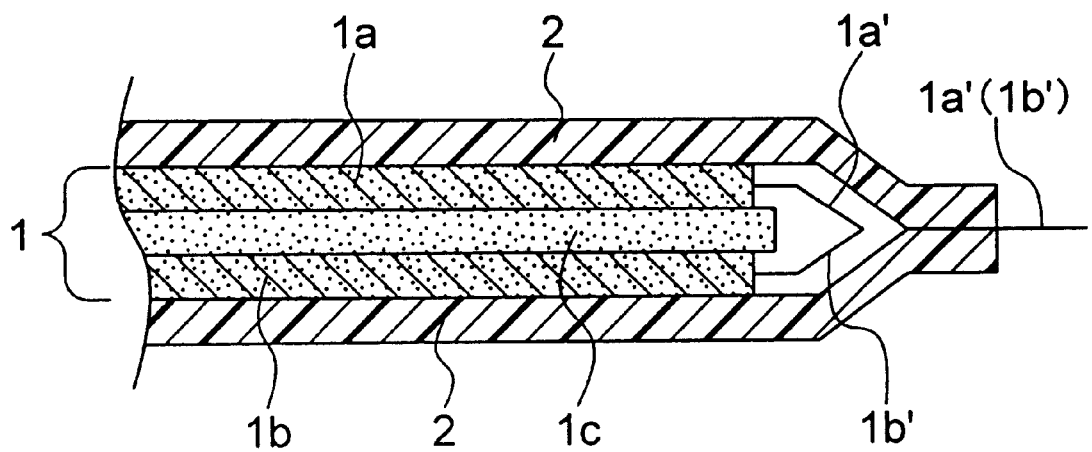
FIG. 3 is a cross section showing a substantial constitution of a polymer battery.

Thus, after injecting and impregnating the definite amount of the electrolytic solution, as shown in FIG. 2B, the end side of the opening 3a of the envelope film body 3 is hot-melted to seal. That is, a region 3d at the opening 3a side of the envelope film body 3 extended outwards from the aligned and accommodated battery element 4 and in the close vicinity of the battery element 4 is hot-melted to seal hermetically. Then, as shown in FIG. 2C, the envelope film body 3 sealed hermetically by the hot-melting, with the region 3d thereof remained, is cut to separate to obtain a battery that has the prescribed dimension and shape and conforms to a prescribed provision.

The present invention is not restricted to the aforementioned embodiment and can be modified into various forms within the range that does not deviate from the spirit of the invention. For instance, constituent materials of the envelope film body can be changed to the other materials, or the envelope film body can be formed, in the step of assembling the battery element, by hot-melting or adhering the envelope film folded together. Further, the present invention is not restricted to the battery element of such as the polymer battery.

In addition, the aforementioned embodiments are constituted so that after setting a battery in a chamber to evacuate the chamber, an electrolyte liquid is injected. However, after setting the battery in the chamber and the electrolyte is injected, the chamber may be evacuated.

According to the present invention, since a definite amount of electrolytic solution can be accurately injected and impregnated, batteries of high quality can be provided with high yield. That is, with the envelope film body formed longer than the battery element, part thereof is used to form a temporary reservoir of the electrolytic solution. Since the electrolytic solution is injected there to fill, the definite amount of the electrolytic solution can be firmly injected to fill. Further, in the step of injecting the electrolytic solution to fill, for instance a funnel for injection is not required to attach or detach. Accordingly, there is no waste or leakage of the electrolytic solution. As a result, batteries of high quality can be provided with low costs and high yield.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A method of manufacturing at least one battery having a prescribed shape and dimension, the method comprising:
   accommodating a battery element in an envelope film body of which one end side is opened to form an opening for injecting an electrolytic solution; and
   sealing the opening after injecting an electrolytic solution into the opening of the envelope film body,
   wherein a side adjacent the opening of the envelope film body is made larger than the prescribed shape and dimension to use as a temporary reservoir region for the electrolytic solution, after injection of a prescribed amount of the electrolytic solution the region of the prescribed shape and dimension being sealed and cut to form a battery.

2. The method set forth in claim 1, wherein the envelope film body is formed of a laminate film in which layers of resin are disposed on both surfaces of a layer of metal.

3. The method set forth in claim 1, wherein the envelope film body is sealed by melting a hot-melt resin disposed on a sealing region outside of at least the region of the prescribed shape and dimension.

4. A method of manufacturing at least one battery, the method comprising:
   accommodating a battery element in an accommodating portion of an envelope film body, the envelope film body comprising an opening at one end side and a closed bottom portion at another end side to accommodate a battery element, being provided with the accommodating portion for accommodating the battery element at a position toward the bottom portion between the bottom portion and the opening, comprising a temporary reservoir region of an injected electrolytic solution between the accommodating portion and the opening;

injecting a prescribed amount of the electrolytic solution into the opening of the envelope film body;

sealing the envelope film body at a sealing region between the temporary reservoir region and the accommodating portion; and cutting the envelope film body at the sealing region to form a battery.

5. The method set forth in claim 4, wherein the envelope film body is formed of a laminate film in which layers of resin are disposed on both surfaces of a layer of metal.

6. The method set forth in claim 4, wherein the envelope film body is sealed by melting a hot-melt resin disposed at least on a sealing region.

7. The method set forth in claim 4, wherein the electrolytic solution is supplied into the opening under atmospheric pressure or under pressure to inject while maintaining the envelope film body under reduced pressure.

8. A method of manufacturing at least one battery, the method comprising:

accommodating a battery element in an accommodating portion of an envelope film body, the envelope film body comprising an opening at one end side and a closed bottom portion at another end side to accommodate the battery element, being provided with the accommodating portion for accommodating the battery element in a position toward the bottom portion between the bottom portion and the opening, comprising a temporary reservoir region of an injected electrolytic solution between the accommodating portion and the opening;

injecting a prescribed amount of the electrolytic solution into the opening of the envelope film body while maintaining the envelope of the film body under decompression;

impregnating the electrolytic solution in the battery element due to gravitation while maintaining the envelope film body under atmospheric pressure for a prescribed period of time;

sealing the envelope film body at a sealing region between the temporary reservoir region and the accommodating portion; and cutting the envelope film body at the sealing region.

9. The method set forth in claim 8, wherein the envelope film body is formed of a laminate film in which layers of resin are disposed on both surfaces of a layer of metal.

10. The method set forth in claim 8, wherein the envelope film body is sealed by melting a hot-melt resin disposed at least on a sealing region.

11. The method set forth in claim 8, wherein the electrolytic solution is injected into the opening by supplying the electrolytic solution under one of atmospheric pressure and pressure.

* * * * *